United States Patent
Tang et al.

(10) Patent No.: US 7,302,098 B2
(45) Date of Patent: Nov. 27, 2007

(54) CHARACTER SEGMENTATION METHOD AND APPARATUS

(75) Inventors: Bei Tang, Hoffman Estates, IL (US); King F. Lee, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 607 days.

(21) Appl. No.: 11/004,738

(22) Filed: Dec. 3, 2004

(65) Prior Publication Data

US 2006/0120602 A1    Jun. 8, 2006

(51) Int. Cl.
 *G06K 9/34* (2006.01)
(52) U.S. Cl. ............................ 382/177; 382/174
(58) Field of Classification Search ............... 382/174, 382/177, 200, 266, 237
See application file for complete search history.

(56) References Cited

U.S. PATENT DOCUMENTS 5,384,864 A * 1/1995 Spitz ..................... 382/174
6,327,384 B1 * 12/2001 Hirao et al. ............. 382/173
6,449,391 B1    9/2002 Ku
6,473,517 B1   10/2002 Tyan et al.
6,909,805 B2 * 6/2005 Ma et al. ................. 382/170

\* cited by examiner

*Primary Examiner*—Phuoc Tran

(57) ABSTRACT

An electronic device (1100) and a method for character segmentation (100) includes an image analyzer (1110) that generates individual character images. The image analyzer binarizes (115) a gray scale image (200) of a horizontal row of characters by using a general threshold method to generate a first image (300). The image analyzer also binarizes (120) the gray scale image using an edge detection method to generate a second image (405). The image analyzer determines (125) a character row region (425) of the second image by using horizontal projection analysis. The image analyzer isolates (130) the character row region of the first image using the character row region of the second image. The image analyzer uses the character row region to generate (135) individual character images. The electronic device may include an image capture device (1105) and a character recognition program (1115).

8 Claims, 5 Drawing Sheets

CHARACTER SEGMENTATION METHOD AND APPARATUS

FIELD OF THE INVENTION

The present invention is generally in the field of image recognition and is more specifically in the field of character recognition.

BACKGROUND

Image recognition is an important field of development today, having become more so in the last few years for the purposes of homeland security. Among the tasks that need to be performed in image recognition is the task of character recognition. One significant aspect of character recognition is attempting to perform character recognition when the characters are surrounded at least partially by clutter. Two examples of this clutter aspect of character recognition that are clearly within the area of security are license plate recognition and vehicle signage recognition (that is, signs on the backs or sides of trucks and vans). In both of these examples the important characters may be presented with clutter around the characters. For license plates, the clutter could be artwork at the bottom of the license plate that extends into the characters. For truck signage, artwork could also extend into the characters. In either example, dirt could clutter the characters. Other examples may not be closely related to security but may have economic importance.

In addition to security value, license plate recognition has commercial value for tollway enforcement. Recognition of characters on printed materials such as magazine covers or T shirts could be useful for commercial purposes. One example is television coverage within which persons or objects are best presented with anonymity (an example is reality police shows), so it may be important to identify characters on license plates or T-shirts that need to be obscured before or while being broadcast. The characters may be cluttered with artwork.

Present image processing techniques have employed refinements such as pixel projection of a binarized image that is suspected to include at least a row of characters to attempt to improve character recognition, but there is substantial room for improved reliability before such techniques even approach the ability of a person to achieve character recognition under circumstances of clutter. The binarized images used in these present image processing techniques may be generated from a gray scale image using generalized threshold or edge determination techniques. These present image processing techniques suffer in their reliability of determining individual characters, particularly when the image includes background clutter within the characters, either at their top or bottom regions, or in some combination.

BRIEF DESCRIPTION OF THE DRAWINGS

The present invention is illustrated by way of example and not limitation in the accompanying figures, in which like references indicate similar elements, and in which.

Figure 1:
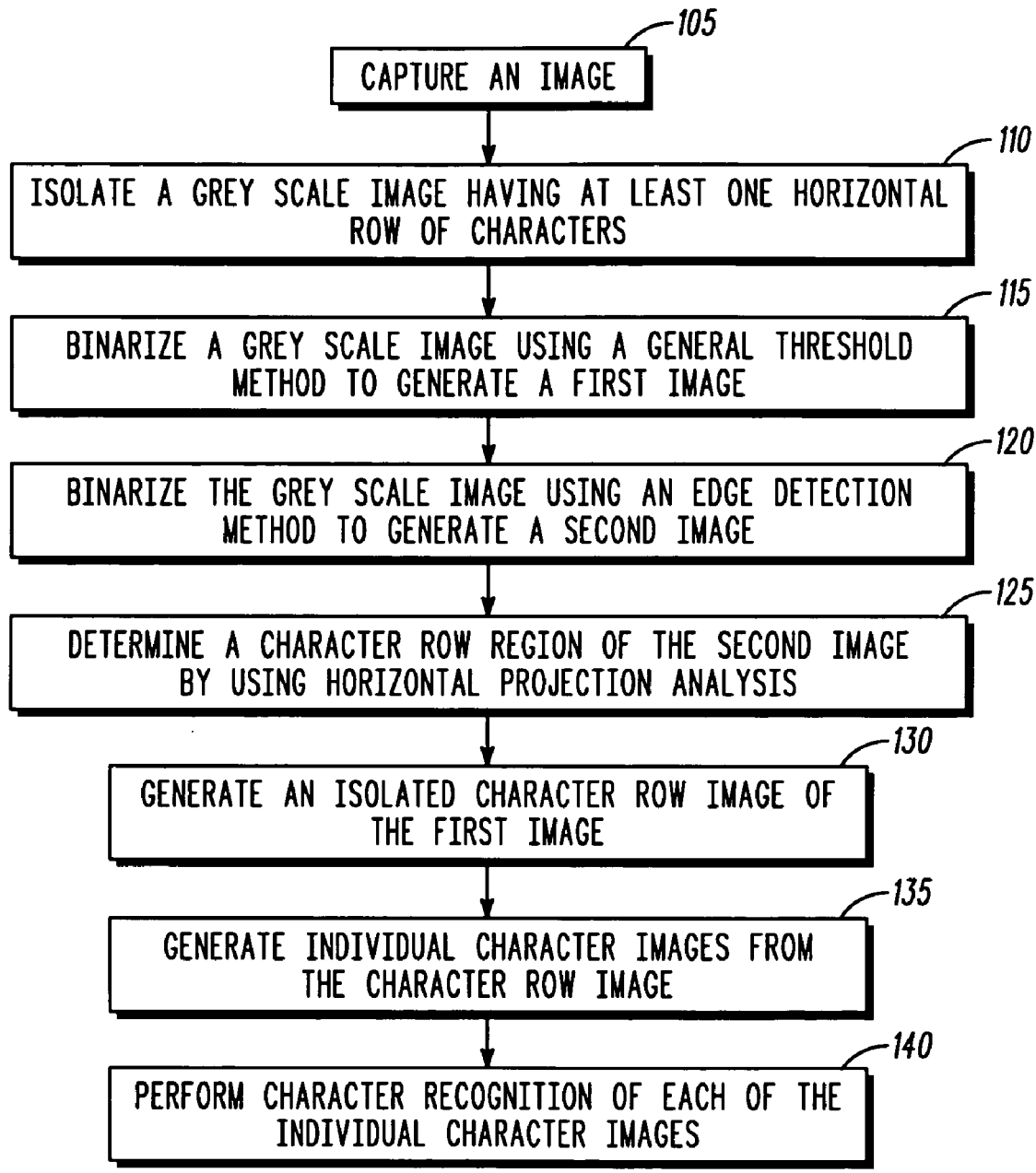
FIGS. 1, 6, 7, and 9 are flow charts that show methods of character segmentation, in accordance with embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular image recognition technology in accordance with the present invention, it should be observed that the present invention resides primarily in combinations of method steps and apparatus components related to image recognition. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

Referring to FIG. 1, some steps of a method for analyzing an image are shown, in accordance with some embodiments of the present invention. An image is captured at step 105, using for example a conventional digital camera mounted in a car, alongside a road, or on a toll booth. The camera could alternatively be a television camera. The image may be a frame of a video image that includes, for example, a rear end of a car. Within the image may be at least one row of characters. Characters in this document include alphanumeric characters, punctuation, and symbols. Symbols include those generated by a symbol font, just a few examples of which are half moons, hearts, and Greek letters. In some embodiments the row has a height definable by a sufficient number of symbol parts that are at a bottom boundary and top boundary of the row. In some embodiments the row includes only symbols that extend from the bottom boundary to the top boundary, which could include capital letters. In some embodiments, not all the characters need extend from the bottom boundary of the row to the top boundary of the row. In some embodiments parts of a relatively few characters in a row may extend below the bottom boundary of the row or above the top boundary of the row.

The image may be one that comprises pixels, each pixel having a plurality of possible values within a range. Examples of such range include gray scale pixels having 16 or 256 possible "gray" values, or color pixels having 16, 256, or millions of possible color values. Other range variations may be used. The row of characters within the image may be distorted due to the field of view of the camera not being perpendicular to a plane of the characters. When this is the case, conventional techniques may be used to modify the row of characters, using a border around the characters or other conventional techniques for analyzing the distortion and largely correcting the distortion. When the image includes a license plate, which is one use that may benefit greatly by this invention, a border of the license plate is often easily analyzed and used to determine a correction for a distorted license plate image. A border may also be conveniently used to isolate a portion of the image that is suspected of having the row of characters, using conventional techniques. When the image is in color, it may be converted to a gray scale image by conventional techniques. This is one example of isolating a gray scale image suspected of having at least one horizontal row of characters described at step 110. In accordance with some embodiments of the present invention, the image captured in step 105 may be identical to the image used in step 110. For example, a gray scale camera may be positioned to capture a railroad car identification that is essentially always perpendicular to the axis of the field of view of the camera and has known dimensions.

Figure 2:
FIG. 2 is a rendering of a gray scale image of a license plate having a row of characters, in accordance with embodiments of the present invention.

Referring to FIG. 2, a rendering of a gray scale image 200 of a license plate having a row of characters is shown, in accordance with embodiments of the present invention. The gray scale image is approximately 80 by 160 pixels of black, white, and varying shades of gray, and is representative of images referred to in step 110. There are many applications for which a determination of the characters that are in the image is desirable. The gray scale image has been isolated from a larger image that includes the back of the automobile having the license plate, and the gray scale image is suspected of including a row of characters because a rectangular border of the license plate has been identified and has the correct height and width dimensions in comparison to each other and in comparison to dimensions of other items, for example the known field of view of the larger image, the distance of the image from the camera, and the size of the automobile.

Figure 3:
FIG. 3 is a rendering of a first image that is a binarized image of the gray scale image shown in FIG. 2, in accordance with some embodiments of the present invention.

Referring again to FIG. 1 and now also to FIG. 3, the gray scale image 200 (FIG. 2) is binarized (reduced to black and white pixels) at step 115 (FIG. 1) using a general threshold method to generate a first image. As examples of a general threshold method, a distribution of the quantities of pixels having each gray scale value may be used, with the threshold being determined as the mean, median, or mode of the distribution. Somewhat more sophisticated techniques could be used, such as first fitting the distribution to a curve, then picking a mean, median, or mode of the curve for the threshold. A rendering of the first image 300 (FIG. 3) that may result from binarizing the gray scale image 200 (FIG. 2) using a general threshold technique is shown in FIG. 3.

Figure 4:
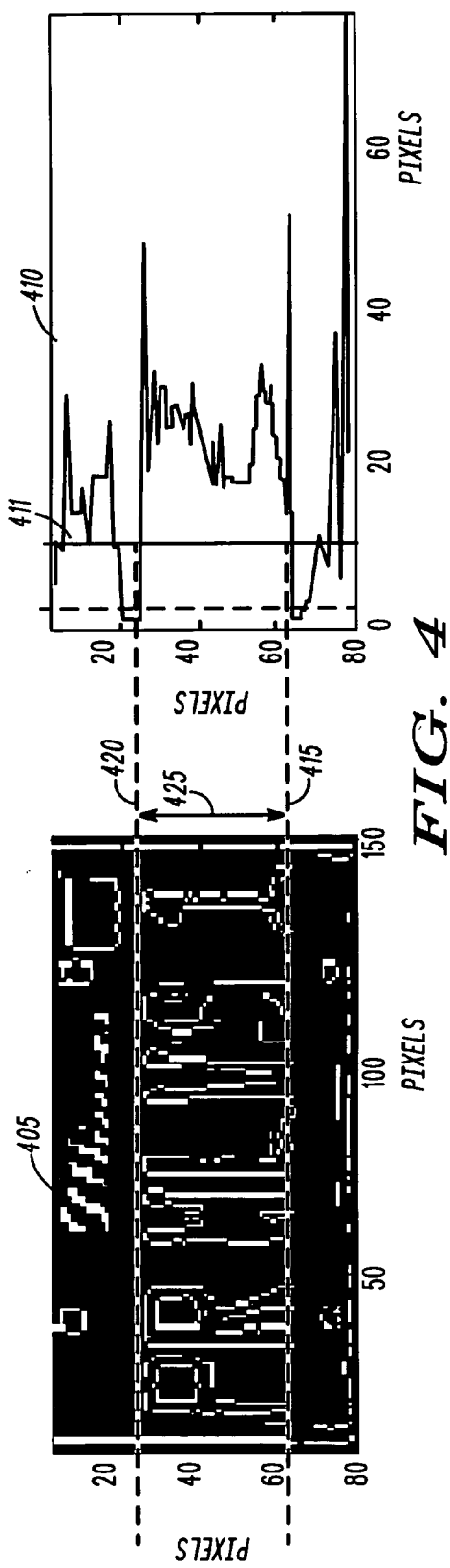
FIG. 4 is a rendering of a second image that is a binarized image of the gray scale image shown in FIG. 2, in accordance with some embodiments of the present invention.

Referring again to FIG. 1 and now also to FIG. 4, the gray scale image 200 is binarized at step 120, this time using a conventional edge detection method, thus generating a second image 405. At step 125, a character row region of the second image 405 is determined. A rendering of the second image 405 and a corresponding graph 410 in FIG. 4 are provided to illustrate steps 120 and 125 of FIG. 1. The graph 410 has a plot of the number of pixels for each pixel row in the second image 405 that have a state that indicates a probable edge of the gray scale image 200. From this plot, which is called a horizontal projection of the second image 405 (the edge detected image), a bottom boundary 415 and a top boundary 420 are determined. These boundaries are used to determine, or define, a character row region 425 of the second image 405.

Figure 5:
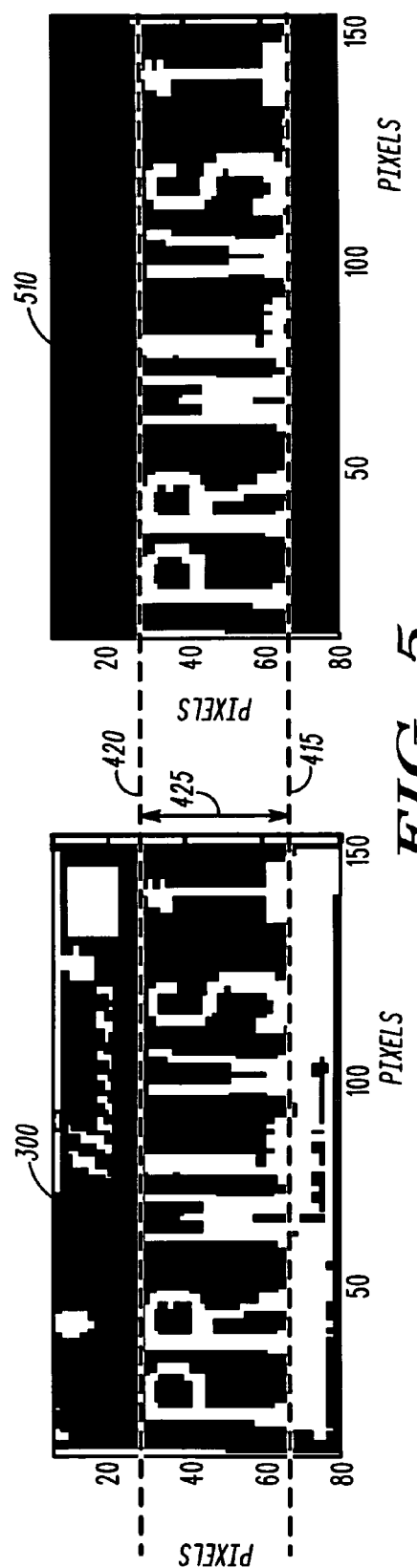
FIG. 5 illustrates using a character row region of the second image to generate an isolated character row image from the first image, in accordance with embodiments of the present invention.

Referring again to FIG. 1 and now also FIG. 5, the character row region 425 of the second image is used to generate an isolated character row image 510 from the first image 300 at step 130, in accordance with embodiments of the present invention. This may be accomplished by replacing all white pixels that are outside the bottom and top boundaries 415, 420 with black pixels, as shown in rendering 510 of FIG. 5. Isolation could be performed in alternative manners, for example, making one row of pixels above and below the bottom and top boundaries 415, 420 all black and reducing the vertical size of the resulting image to include the rows between the bottom and top boundaries 415, 420 and the single rows of black pixels above and below them (not illustrated in the figures).

Figure 6:
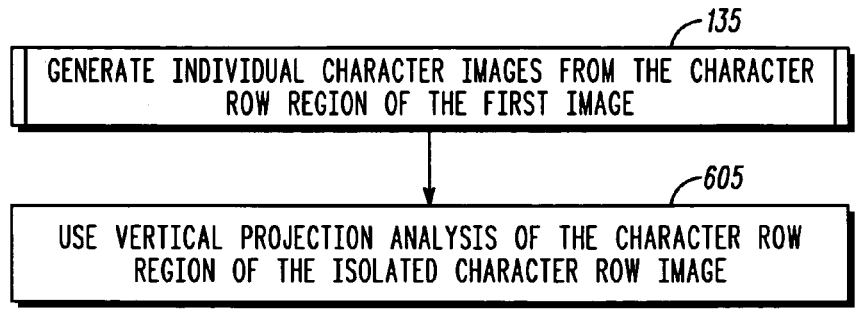
Figure 7:
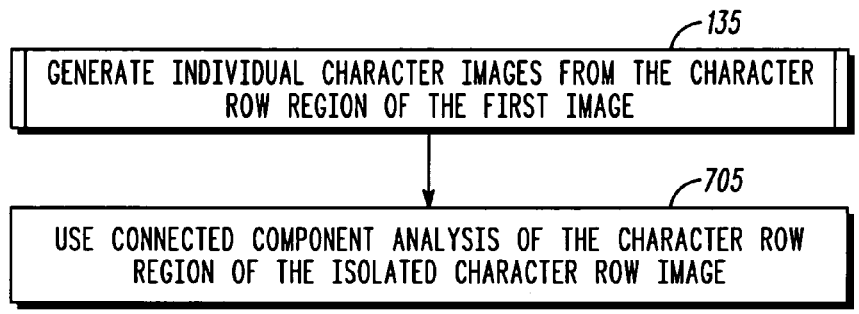
Figure 8:
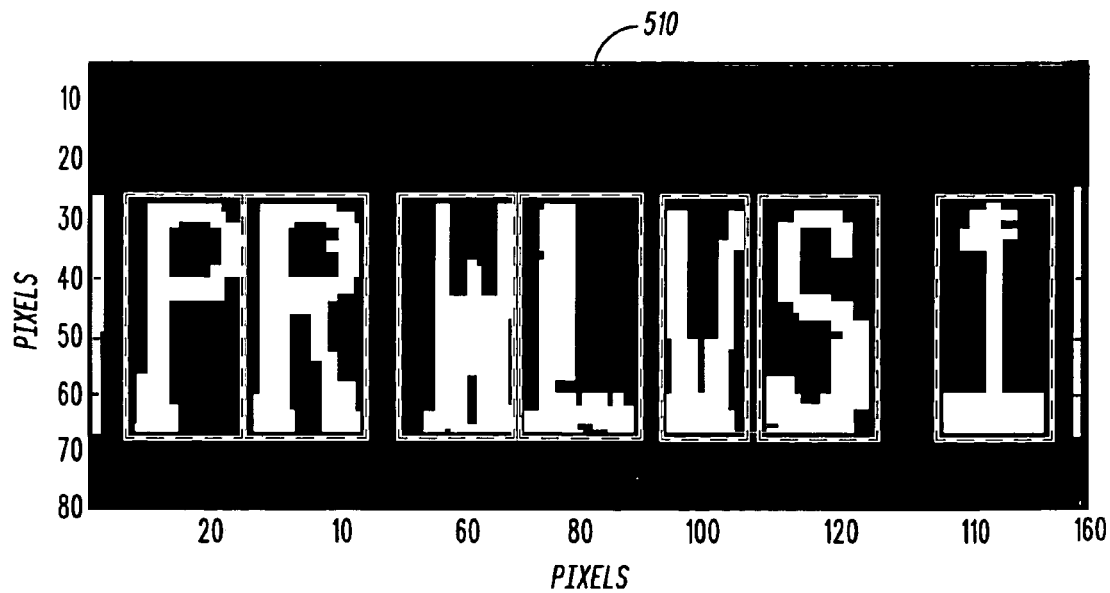
FIG. 8 is a rendering of the individual character images that may result from an analysis of an isolated character row image, in accordance with some embodiments of the present invention.

Referring again to FIG. 1 and now also FIGS. 6, 7 and 8, individual characters images are generated from the isolated character row image 510, using methods in accordance with embodiments of the present invention. In some embodiments, a conventional vertical projection analysis of the isolated character row image is used, as shown at step 605 of FIG. 6. In other embodiments, a conventional connected component analysis of the isolated character row image is used, as shown at step 705 of FIG. 7. FIG. 8 is a rendering of the individual character images that may result from a connected component analysis of the isolated character row image 510, in which the individual character images are identified by white boundary lines.

Referring again to FIG. 1, the individual character images are presented to a character recognizer, such as a conventional optical character reader (OCR) tool, that analyzes the pixels to determine a most likely character. Other information, such as a type of image from which the individual character images have been obtained may also be presented to the OCR tool to improve the reliability of recognition. For example, the OCR may reduce a database of fonts to some predefined subset when the image type is identified as a license plate.

Figure 9:
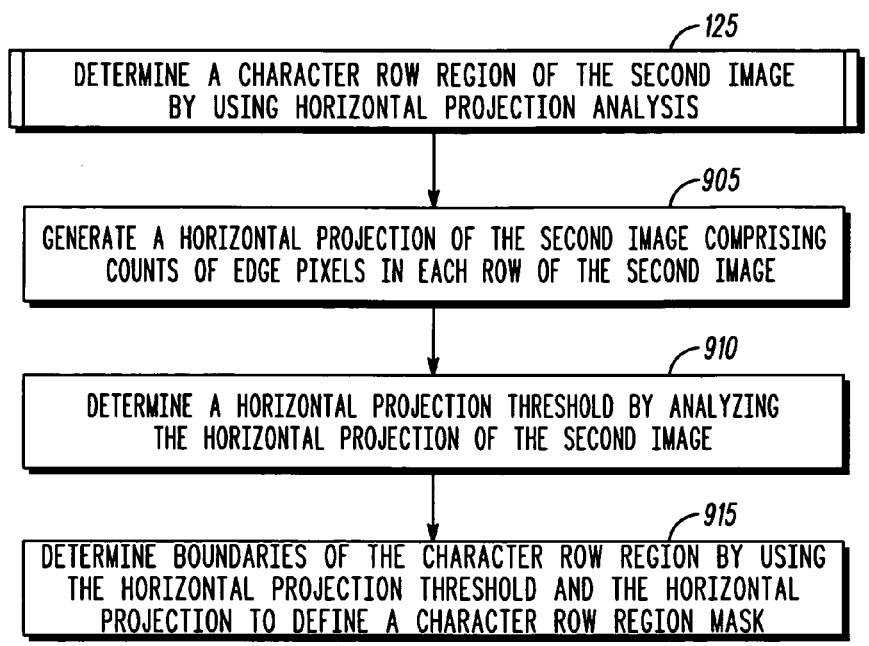
Figure 10:
FIG. 10 is a graph that shows a technique for using a threshold to create a binary mask for isolating a character row image, in accordance with some embodiments of the present invention.

Referring now to FIG. 9, details of step 125 (FIG. 1) are shown, in accordance with some embodiments of the present invention. At step 125, the character row region 425 is determined using horizontal projection analysis. At step 905, a horizontal projection of the second image 405 is made, using conventionally defined techniques for horizontal projections of binary images. A plot of the quantity of pixels in each row that are in a binary state representing a probable edge of the binary image is made in the horizontal axis of the graph 410. In an example of some embodiments, a threshold 411 (FIG. 4) is determined at step 910 by analyzing the horizontal projection. This may be determined, for example, as the mean value of the quantities of edge pixels in the plot, or a value that is a predetermined amount greater than an average of some number of rows having the smallest quantities of edge pixels. Other approaches to determining a threshold may be used (e.g., the mode, the median). At step 915, the threshold may be used to create a binary mask, as shown in FIG. 10. The character row region 425 may then be determined by a contiguous group of pixel rows having their quantity of edge pixels above the threshold, where the number of rows in the group of rows is within some range. More sophisticated rules may alternatively be used, allowing for some small number of rows having quantities of edge pixels below the threshold within the "contiguous" group.

Other techniques may involve using contiguous groups of rows having edge pixel quantities that are below a threshold as being indicators of solid blocks of pixels above and below pixel rows that are thereby determined as the bottom and top boundaries 415, 420. Or, a large change in the quantities in adjacent rows could be used.

It will be appreciated the methods described herein may be implemented using one or more conventional processors and unique stored program instructions that control the one or more processors to implement, in conjunction with certain non-processor circuits, some, most, or all of the steps of the methods described herein. The non-processor circuits may include, but are not limited to signal conditioners, clock circuits, power source circuits. Alternatively, some or all of the steps of the methods could be implemented by a state machine that has no stored program instructions, in which each step or some combinations of certain of the steps are implemented as custom logic. Of course, a combination of the two approaches could be used. Thus, means for these methods have been described herein.

Figure 11:
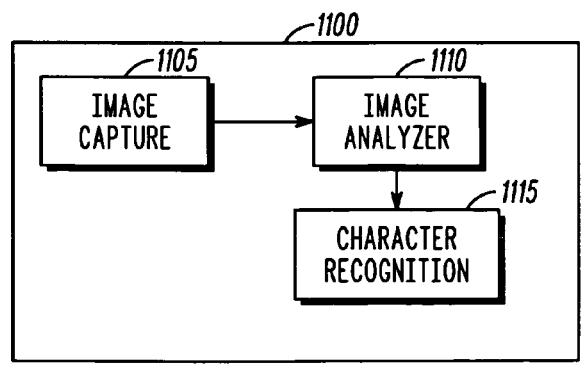
FIG. 11 is a block diagram of an electronic device that includes an image analyzer, in accordance with some embodiments of the present invention.

Referring now to FIG. 11, a block diagram of an electronic device 1100 is shown, in accordance with some embodiments of the present invention. The electronic device 1100 comprises an image capture means 1105 coupled to an image analyzer 1110, which is in turn coupled to a character recognition means 1115. The image capture means 1105 may be an apparatus such as a color video camera or a gray scale black and white still camera. The image capture means 1105 generates a gray scale image that includes a horizontal row of characters. The image analyzer means 1110 may first analyze the gray scale image to isolate an area that has high probability of including a horizontal row of characters, by using known techniques. For example, when the image capture means 1105 is positioned to capture an image of the front or rear of a vehicle, boundaries for a license plate can be sought by known techniques that meet predetermined proportional and size parameters. The image analyzer 1110 further comprises means that generate individual character images which comprise a first means for binarizing a gray scale image of the horizontal row of characters using a general threshold method to generate a first image, a second means for binarizing the gray scale image using an edge detection method to generate a second image, means for determining a character row region of the second image by using horizontal projection analysis, means for isolating the character row region of the first image using the character row region of the second image; and means for using the isolated character row region to generate individual character images. The character recognition means 1115 recognizes the individual character images using conventional techniques. The means that form the electronic device 1100 may be realized partially or completely in the form of stored program controlled processing devices, or state machine devices, in combination with other electronic devices.

It will be appreciated that the means and methods described herein provide significant reliability improvement over the techniques used in some conventional systems, particularly in performing character segmentation for some commonly encountered circumstances such as license plates that have clutter around the characters. (A number states of the United States include such things as vistas at the bottom portions of the characters in the license plates that cause such clutter). For a first conventional technique, in which both vertical and horizontal projections are made from a single binarized image such as the first image 300 (FIG. 3), which is generated using a general threshold technique, it can be understood that the horizontal projection will not provide a good a good indication of the bottom boundary of the characters because of the clutter at the bottom, thus making the determination of individual character blocks unreliable in those situations. For a second conventional technique, in which both vertical and horizontal projections are made from a single binarized image such as the second image 405 (FIG. 4), which is generated by an edge determination technique, it can be understood that the vertical edge indications made from the vertical projection will become very ambiguous because many characters have a plurality of vertical lines. So, for this second conventional technique, the reliability may suffer substantially. In contrast, the unique technique described in accordance with the present invention uses a horizontal projection of an image that has been binarized using edge determination to identify a mask, followed by a masking step to find character row boundaries using the mask, thereby isolating the character row pixels from surrounding clutter pixels and thus allowing more reliable individual character determination.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of character segmentation for character recognition, comprising:

first binarizing a gray scale image using a general threshold method to generate a first image;

second binarizing the gray scale image using an edge detection method to generate a second image;

determining a character row region of the second image by using horizontal projection analysis;

generating an isolated character row image of the first image using the character row region of the second image; and generating individual character images from the isolated character row image.

2. The method according to claim 1, wherein generating individual character images is accomplished by using vertical projection analysis of the isolated character row image.

3. The method according to claim 1, wherein generating individual character images is accomplished by using connected component analysis of the isolated character row image.

4. The method according to claim 1, further comprising performing character recognition of each of the individual character images.

5. The method according to claim 1, wherein determining a character row region of the second image further comprises:

generating a horizontal projection of the second image comprising counts of edge pixels in each row of the second image;

determining a horizontal projection threshold by analyzing the horizontal projection of the second image;

determining boundaries of the character row region by using the horizontal projection threshold and the horizontal projection to define a character row region mask.

6. The method according to claim 1, further comprising:

capturing an image; and generating a gray scale image having at least one horizontal row of characters comprising the individual character images.

7. A means for performing character segmentation for character recognition, comprising:

first means for binarizing a gray scale image using a general threshold method to generate a first image;

second means for binarizing the gray scale image using an edge detection method to generate a second image;

means for determining a character row region of the second image by using horizontal projection analysis;

means for isolating the character row region of the first image using the character row region of the second image; and means for using the isolated character row region to generate individual character images.

8. An electronic device, comprising:

image capture means that generate a gray scale image that includes a horizontal row of characters;

image analyzer means that generate individual character images, comprising first means for binarizing a gray scale image of the horizontal row of characters by using a general threshold method to generate a first image, second means for binarizing the gray scale image using an edge detection method to generate a second image, means for determining a character row region of the second image by using horizontal projection analysis, means for isolating the character row region of the first image by using the character row region of the second image, and means for using the isolated character row region to generate individual character images; and character recognition means for recognizing the individual character images.

* * * * *

UNITED STATES PATENT AND TRADEMARK OFFICE
CERTIFICATE OF CORRECTION

PATENT NO.        : 7,302,098 B2
APPLICATION NO. : 11/004738
DATED              : November 27, 2007
INVENTOR(S)       : Bei Tang et al.

Page 1 of 1

It is certified that error appears in the above-identified patent and that said Letters Patent is hereby corrected as shown below:

- In Fig. 8, Sheet 4 of 5,
  delete:

" 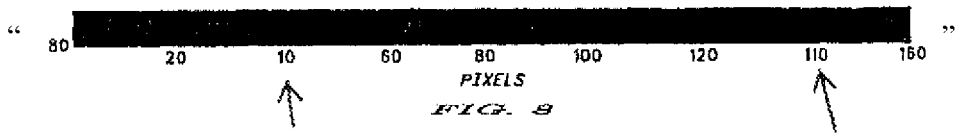 "

and insert:

-- 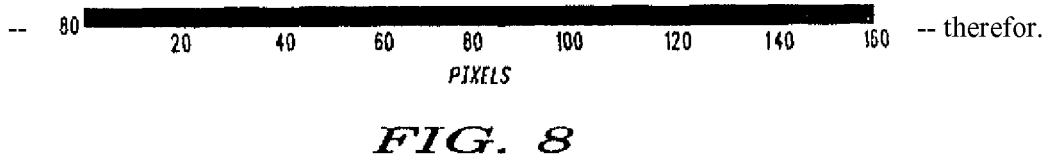 -- therefor.

*FIG. 8*

Signed and Sealed this

Twenty-first Day of July, 2009

JOHN DOLL
*Acting Director of the United States Patent and Trademark Office*